United States Patent
Thaerigen

(10) Patent No.: US 8,887,784 B2
(45) Date of Patent: Nov. 18, 2014

(54) ULTRASONIC VIBRATION UNIT

(75) Inventor: Jan Thaerigen, Löhningen (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/876,014

(22) PCT Filed: Sep. 9, 2011

(86) PCT No.: PCT/EP2011/065669
§ 371 (c)(1),
(2), (4) Date: Mar. 26, 2013

(87) PCT Pub. No.: WO2012/048968
PCT Pub. Date: Apr. 19, 2012

(65) Prior Publication Data
US 2013/0213580 A1    Aug. 22, 2013

(30) Foreign Application Priority Data
Sep. 27, 2010   (DE) .......................... 10 2010 041 432

(51) Int. Cl.
| B32B 37/00 | (2006.01) |
| B29C 65/08 | (2006.01) |
| B29C 65/00 | (2006.01) |
| B06B 3/00 | (2006.01) |

(52) U.S. Cl.
CPC ........... *B29C 65/08* (2013.01); *B29C 66/83511* (2013.01); *B29C 66/1122* (2013.01); *B29C 66/43* (2013.01); *B06B 3/00* (2013.01); *B29C 65/085* (2013.01)
USPC .................................. 156/580.2; 156/580.1

(58) Field of Classification Search
USPC ............ 156/73.1, 580.1, 580.2; 53/450, 459, 53/479, 550, DIG. 2
See application file for complete search history.

(56) References Cited

U.S. PATENT DOCUMENTS

| 6,574,944 | B2 * | 6/2003 | Capodieci ........................ 53/450 |
| 8,028,503 | B2 * | 10/2011 | Capodieci ........................ 53/479 |
| 2002/0189206 | A1 | 12/2002 | Capodieci |
| 2003/0155403 | A1 | 8/2003 | Haregoppa et al. |
| 2005/0034820 | A1 | 2/2005 | Schneider |
| 2009/0283570 | A1 | 11/2009 | Gerdes et al. |

FOREIGN PATENT DOCUMENTS

| DE | 3147255 | 6/1983 |
| DE | 10343325 | 3/2005 |
| JP | S58196874 | 11/1983 |
| WO | 02/060674 | 8/2002 |
| WO | 2007/012917 | 2/2007 |
| WO | 2009/156207 | 12/2009 |

OTHER PUBLICATIONS

International Search Report for Application No. PCT/EP2011/065669 dated Mar. 1, 2012 (3 pages).

* cited by examiner

*Primary Examiner* — James Sells
(74) *Attorney, Agent, or Firm* — Michael Best & Friedrich LLP

(57) ABSTRACT

The invention relates to an ultrasonic vibration unit (10) for an ultrasonic welding device for sealing and welding material webs, comprising a sonotrode (12) connected to a converter (14) and having at least one sealing horn (16) radially protruding from an axis of rotation (a) and rotatable about the axis of rotation (a) and having a free end forming a sealing surface (18). The sonotrode (12) comprises a sonotrode shaft (20) having the axis of rotation (a). One or both end faces (22) of the sonotrode shaft (20) are connected to a converter (14) and the sealing horns (16) are attached to the sonotrode shaft (20) directly or by means of boosters (24, 26) when vibrational nodes ($K_L$) of a longitudinal vibration ($S_{WT}$) of the sonotrode shaft (20) are present.

9 Claims, 2 Drawing Sheets

ULTRASONIC VIBRATION UNIT

BACKGROUND OF THE INVENTION

The present invention relates to an ultrasonic vibration unit for an ultrasonic welding device for sealing and welding material webs, comprising a sonotrode connected to a converter and having at least one sealing horn radially protruding from an axis of rotation and rotatable about the axis of rotation and having a free end forming a sealing surface.

Ultrasonic welding is a method for joining plastics. Ultrasound is a mechanical vibration above the auditory threshold. The frequency range begins at approximately 20 kHz and extends up to frequencies of 1 GHz. Such ultrasonic frequencies are frequently produced from electrical energy with the help of piezoelectric sound transducers (converters). This mechanical vibration energy is applied to the workpiece or the material being processed via the sonotrode connected to the converter, if required via an amplitude transformation unit (booster). The surface of the sonotrode, which is provided to enter into contact with the material being processed, is also referred to as a sealing surface.

The ultrasonic vibration unit therefore constitutes a structure that vibrates during operation and comprises the converter, if required the booster and the sonotrode.

In order to effectively transfer the ultrasonic vibration using the ultrasonic vibration unit, it is necessary to put the ultrasonic vibration unit into resonance. Depending on the design of the ultrasonic vibration unit, said unit has a plurality of natural frequencies. Only if the converter produces a natural frequency of the ultrasonic vibration unit does a resonant vibration of said ultrasonic vibration unit occur. For that reason, converter and ultrasonic vibration unit have to be synchronized to each other.

Strictly speaking, the resonance frequency differs somewhat from the natural frequency because each real system is attenuated. In the following—as is also frequently the case in the technical literature—the terms resonance frequency and natural frequency are used synonymously. The most important natural frequency of the ultrasonic vibration unit is generally the natural frequency whereat a standing longitudinal vibration comprising wave nodes and wave troughs develops in the ultrasonic vibration unit. In doing so, a wave trough develops in each case at the face ends of the sonotrode.

The converter is connected to one of the face ends, which produces the corresponding ultrasonic excitation frequency. If applicable, an amplitude transformer (booster) is connected between converter and sonotrode, which booster changes the amplitude of the ultrasonic vibration but not the frequency. By providing a booster, the natural frequency of the sonotrode and therefore the position of the node of the longitudinal vibration are not influenced.

In many of the applications, the amplitude transformation unit is integrally formed with the sonotrode, i.e. can no longer be optically differentiated. In order therefore to differentiate the sonotrode from said amplitude transformation unit, it is necessary to determine the position of the vibration antinodes of the pure longitudinal vibration. The sonotrode generally comprises the sealing surface. Each section, which extends in the longitudinal direction from vibration maximum to vibration maximum and which does not influence the natural frequency of the pure longitudinal vibration, is not part of the sonotrode. If, on the other hand, such a section influences the natural frequency of the pure longitudinal vibration, i.e. said section cannot be removed without a significant change in the natural frequency occurring, said section then belongs to the sonotrode.

When processing materials with the aid of ultrasound, the material to be processed is generally positioned between the sonotrode and a counter tool, which does not belong to the vibration structure and is also referred to as the anvil. The sonotrode which is in contact with the material to be processed transfers the ultrasonic energy to the material to be processed, which is thereby, for example, welded or detached. The heat required to plasticize the material web is produced by converting ultrasonic vibrations into frictional energy. Due to the interfacial and molecular friction, heat thus develops which causes the plastic to start to melt.

In the case of most sonotrodes, the longitudinal ultrasonic vibration is used for transferring energy over the sealing surface.

There are however also sonotrodes having a sealing surface substantially in the shape of a cylinder jacket surface. These sonotrodes use the radial ultrasonic vibration, which forms transversely to the longitudinal direction of propagation of the ultrasonic vibration, for transferring energy. Said sonotrodes frequently consist of a substantially rod-shaped section, to which the converter and if applicable the booster are connected, and a wheel-shaped or bell-shaped section protruding radially over the rod-shaped section. The wheel- or bell-shaped section comprises the sealing surface.

These sonotrodes have generally two main natural vibration modes.

The one natural vibration mode corresponds substantially to the longitudinal resonance vibration of the rod-shaped section. Said resonance vibration has a relatively large longitudinal vibration amplitude. This is however associated with a forced influencing of the material in the transverse direction, i.e. perpendicularly to the rod axis. Said forced influencing manifests itself in a thickness vibration, which propagates radially with respect to the rod axis. The vibration amplitude of the thickness vibration is relatively small, which results in the majority (more than 90%) of the vibration energy absorbed in the vibration system being contained in the longitudinal vibration.

The other natural vibration mode corresponds substantially to the resonance of the radial vibration of the wheel-shaped section. A comparatively small (forced) vibration in the longitudinal direction is associated therewith. In said natural vibration mode, the majority (usually more than 90%) of the vibration energy absorbed in the vibration system is contained in the radial vibration.

During rotation welding, the second natural vibration mode is used because by generating a relatively small longitudinal vibration in the rod-shaped section of the sonotrode, a relatively large radial vibration in the wheel-shaped section of the sonotrode can be generated.

Sonotrodes are thus known which have a sealing surface in the shape of a cylindrical surface and are used for the continuous ultrasonic processing of moved material webs. Said sonotrodes are rotated about the longitudinal axis thereof during operation so that the cylinder surface-shaped sealing surface moves substantially at the same speed as the material web to be processed. In the case of said sonotrodes, only a small part of the sealing surface is therefore in contact with the material web.

An ultrasonic welding device of the kind mentioned at the beginning of the present application is known from the WIPO patent application WO 2007/012917 A1. The device of multi-rotor design consists of two rotating shafts disposed parallel to one another. Sonotrodes are on the one shaft and anvils are mounted o the other shaft. The converters serving to feed the sonotrodes are likewise situated on the rotating shaft. A disadvantage with said device is that a converter is required for each sonotrode. In the case of, e.g., a four rotor embodiment, four converters are therefore necessary, which leads to high costs. Converters and sonotrodes have a relatively large overall height, and therefore the center distance of the two parallel shafts has to be selected large. This large center distance requires much space and has a negative effect on the format size range. In the case of a format change from, e.g., a 3-rotor design to a 4-rotor design, a complicated conversion entailing a difficult subsequent alignment is required. This results in greater downtimes and longer startup times after the change in format.

The WIPO patent application WO 2009/156207 A1 discloses a rotating sonotrode, which has a roller-like effective area (sealing surface). The sonotrode is of wavelike design and is optionally furnished with boosters. The sealing surfaces are embodied as radial raised sections that are wheel-shaped or bell-shaped. The sonotrode is supplied axially with ultrasonic energy by a converter. The sonotrode, which is of wavelike design, is embodied as a unit and must therefore in accordance with the vibration properties thereof be designed as a total system. If so-called rotors instead of a roller-like sealing surface are then to be embodied in a sonotrode for a tubular bag machine, this configuration has also to be designed as a total system. In addition, constraints arise with regard to the number of rotors. Hence, the system has, e.g., to be of symmetrical construction, which only allows for an even number of rotors. A replacement of the sonotrode due to maintenance work or also in the case of initial installation is only possible as a whole and is thereby costly. Even changing the number of rotors due to a format adjustment requires a removal of the entire sonotrode which entails a complicated subsequent alignment.

The WIPO patent application WO 02/060674 A1 discloses a rotating sonotrode which is axially fed on both sides with ultrasonic energy. Due to the conical shape and a corresponding hollow space in the sonotrode, the vibration is redirected about an angle of 90° in the radial direction. The advantage of said sonotrode is the possibility of a two-sided mounting, whereby a higher sealing pressure can be generated. The distribution of the vibration on the sealing surface can also be more evenly executed in comparison to conventional conversion of the axial vibration energy into radial vibration energy by means of transverse contraction. Due to the hollow space, only cylindrical shapes are possible for the sonotrode. Sonotrodes having a plurality of rotors, as is required for a tubular bag machine, cannot be implemented on account of the thin, conical walls required for redirecting the waves, said walls reducing the stability of the sonotrode. A further disadvantage is the reduced sealing width and reduced energy distribution on the effective surface. Thus, a limited format range arises as well as an insufficient sealing quality for wide sealing seams.

SUMMARY OF THE INVENTION

The aim underlying the invention is to create an ultrasonic vibration unit of the type mentioned at the beginning of the present application, which has a small structural shape having the largest sealing surface possible when energy is evenly distributed across said sealing surface.

The aforementioned aim is met according to the invention by the sonotrode comprising a sonotrode shaft having the axis of rotation (a), sealing horns and optional boosters, wherein one or both end faces of the sonotrode shaft are connected to a converter and the sealing horns are attached to said sonotrode shaft directly or by means of boosters when vibrational nodes of a longitudinal vibration of said sonotrode shaft are present.

As a result of the inventive embodiment of the ultrasonic vibration unit, multi-rotor embodiments having a free selection of the number of rotors (sealing horns) is possible. In so doing, the greatest possible flexibility and a high power range are ensured while avoiding the disadvantages of the solutions known from the prior art. A simple replacement of the sealing horns can likewise be achieved with the shortest possible machine downtime and a simple alignment.

The ultrasonic vibration unit according to the invention is particularly suitable for producing transverse sealing seams on a tubular packaging film in a vertical or horizontal tubular bagging machine.

The term sonotrode is used below as a composition of the sonotrode shaft, the optional booster and the sealing horns, wherein separate vibrational waves are produced in the sonotrode shaft and in the sealing horns, and the sealing surface is only present on the sealing horns. In contrast, a conventional sonotrode comprises as a rule only one vibrating shaft and includes the sealing surface.

The ultrasonic vibration unit can comprise a plurality of sealing horns—also referred to as rotors—which are attached so as to project radially from the axis of rotation. The attachment can be implemented using different techniques. Sealing horns having a large width can also be attached so as to project radially from the axis of rotation when different vibrational nodes are present.

Each sealing horn can have a single attachment point. A plurality of sealing horns can be disposed so as to project radially from the axis of rotation when one and the same vibrational node is present or in the presence of a plurality of vibrational nodes—i.e. laterally offset with respect to one another as viewed in the direction of the axis of rotation.

Each sealing horn can have at least two attachment points, wherein said attachment points are preferably spaced apart in each case at a distance which is multiple times greater than the wave length of the longitudinal vibration. A plurality of sealing horns can be disposed so as to radially protrude from the axis of rotation when the same or different vibrational nodes are present—i.e. laterally offset with respect to one another as viewed in the direction of the axis of rotation.

BRIEF DESCRIPTION OF THE DRAWINGS

Further advantages, features and details of the invention ensue from the following description of preferred exemplary embodiments as well as with the aid of the drawings, which only assist in explanation and are not laid out in a limiting manner. The drawings show schematically in FIG. 1 an oblique view of an ultrasonic vibration unit.

DETAILED DESCRIPTION

Figure 1:
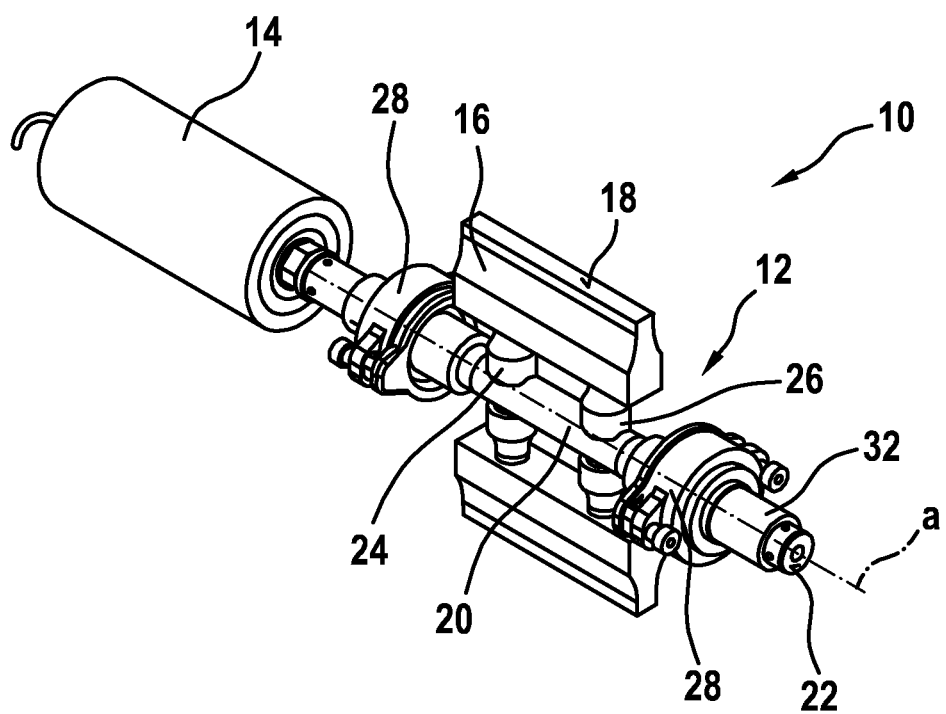
Figure 2:
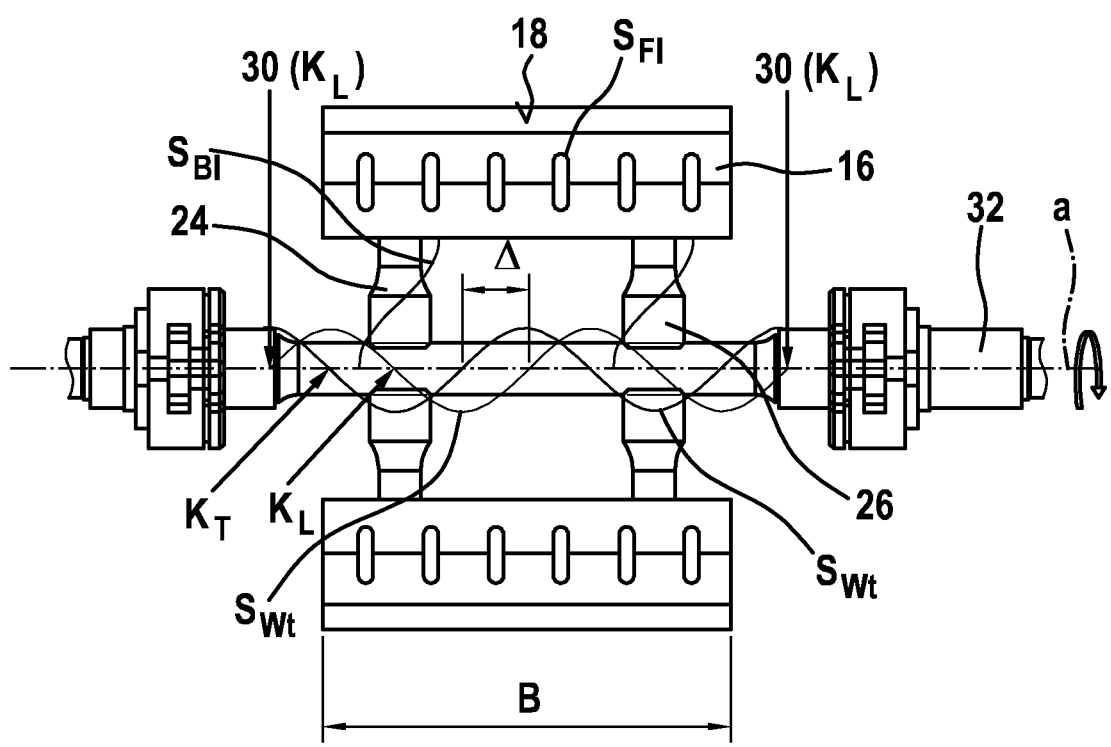
FIG. 2 a lateral view of the ultrasonic vibration unit of FIG. 1.

An ultrasonic vibration unit 10, which is depicted in FIGS. 1 and 2 and is for an ultrasonic welding device for producing transverse sealing seams on a tubular packaging film in a tubular bagging machine, comprises a sonotrode 12 having a sonotrode shaft, which can be rotated about an axis of rotation a and one end face 22 of which is axially connected to a converter 14. It should be noted here that both end faces 22 of the sonotrode shaft can each be connected to a converter 14, i.e. the ultrasonic energy can be simultaneously introduced from both sides into the sonotrode shaft 20. The sonotrode shaft 20 is mounted in bearings disposed on both sides thereof so that said sonotrode shaft 20 can be rotated about the axis of rotation a and is connected to a drive that is not illustrated in the drawing. Two sealing horns 16, which have a width B and comprise a terminal sealing surface 18, are attached to the sonotrode shaft 20 via in each case two boosters 24, 26. Boosters 24, 26 and sealing horns 16 protrude radially from the axis of rotation a. The sealing surfaces 18 lie parallel to the axis of rotation a.

The longitudinal (running in the direction of the axis of rotation a) and transverse (running perpendicularly to the direction of the axis of rotation a) vibrations occurring in the sonotrode shaft 20 are plotted in FIG. 2. The vibrations produced in the boosters 24, 26 and in the sealing horn (rotor) 16 are likewise plotted.

The following denotations for the vibrations are used:
$S_{W1}$ Longitudinal vibration in the sonotrode shaft 20
$Sw_{Wt}$ Transverse vibration in the sonotrode shaft 20
$S_{B1}$ Longitudinal vibration in the boosters 24, 26
$S_{F1}$ Longitudinal vibration in the horn 16
$K_L$ Vibrational nodes of the longitudinal wave in the sonotrode shaft 20
$K_T$ Vibrational nodes of the transverse wave in the sonotrode shaft 20

The mode of operation of the ultrasonic vibration unit 10 is explained below in detail with the aid of FIGS. 1 and 2.

A longitudinal vibration $S_{W1}$ in the direction of the axis of rotation a of the sonotrode shaft 20 is initiated via the converter 14 and held in operation. The longitudinal vibration $S_{W1}$ produces a standing longitudinal wave, which leads to defined nodal points of vibration $K_L$ of the longitudinal wave. A longitudinal vibration results in material being stretched and compressed in length. When the material is compressed, the sonotrode shaft 20 becomes thicker at the compressed location; when the material is stretched, said sonotrode shaft becomes thinner at the stretched location. This fluctuation in thickness leads to a transverse vibration $S_{wt}$, which generates a transverse wave having defined nodal points of vibration $K_T$. The transverse wave has a phase shift Δ with respect to the longitudinal wave.

The attachment of the sonotrode shaft 20 on both sides of a machine stand is implemented in a known manner at the nodal points of vibration $K_L$ of the longitudinal wave. Bushes are, e.g., suitable as fastening parts 32. At least three further nodal points of vibration $K_L$ are required between said two attachment points 30. The longitudinal displacement is equal to zero and the thickness fluctuation is the largest at said nodal points of vibration. The thickness fluctuation is used as an actuator for one or a plurality of sealing horns 16, wherein boosters 24, 26 can be connected in between for amplification of the ultrasound energy. The boosters 24, 26 or the sealing horns 16 are in each case attached at those nodal points of vibration $K_L$ which synchronously increase and decrease in thickness. A new standing longitudinal vibration $S_{F1}$ is formed in the sealing horn 16 with or without boosters 24, 26, said longitudinal vibration $S_{F1}$ being perpendicular to the longitudinal vibration $S_{W1}$ of the sonotrode shaft 20.

The sealing horn 16 having one or a plurality of optional boosters 24, 26 can be configured independently of the sonotrode shaft 20 in the form thereof. In so doing, it is possible to generate an even amplitude distribution on the sealing surface 18, which leads to the sealing seam being of a higher quality. A wider sealing surface of the transverse sealing seam can also thereby be produced.

A plurality of sealing horns 16—with or without boosters 24, 26—can be mounted across the circumference of the sonotrode shaft 20. Independently of one another, said sealing horns can thereby be discretely configured in the form thereof. In contrast to conventional rotary sonotrodes, an arbitrary number of sealing horns 16 with or without boosters 24, 26 can thereby be mounted on the sonotrode shaft 20 in a manner which is limited only by the space that is available.

The invention claimed is:

1. An ultrasonic vibration unit for an ultrasonic welding device for sealing and welding material webs, comprising a sonotrode (12) connected to a converter (14) and having at least one sealing horn (16) radially protruding from an axis of rotation (a) and rotatable about the axis of rotation (a) and having a free end forming a sealing surface (18), wherein the sonotrode (12) comprises a sonotrode shaft (20) having the axis of rotation (a), wherein at least one end face (22) of the sonotrode shaft (20) is connected to the converter (14) and the at least one sealing horn is attached to the sonotrode shaft (20) by means of boosters (24, 26) when vibrational nodes ($K_L$) of a longitudinal vibration ($S_{W1}$) in the sonotrode shaft (20) are present, wherein each booster (24, 26) and the at least one sealing horn (16) extend radially from the axis of rotation (a).

2. The ultrasonic vibration unit according to claim 1, characterized in that each sealing horn (16) has a single attachment point.

3. The ultrasonic vibration unit according to claim 2, characterized in that a plurality of sealing horns (16) is disposed so as to radially protrude from the axis of rotation (a) when one and the same vibrational node ($K_L$) is present.

4. The ultrasonic vibration unit according to claim 2, characterized in that a plurality of sealing horns (16) is disposed so as to radially protrude from the axis of rotation (a) when different vibrational nodes ($K_L$) are present.

5. The ultrasonic vibration unit according to claim 1, characterized in that each sealing horn (16) has at least two attachment points, wherein the attachment points are in each case spaced apart from one another at a distance which is multiple times greater than a wave length of the longitudinal vibration ($S_{W1}$).

6. The ultrasonic vibration unit according to claim 5, characterized in that a plurality of sealing horns (16) is disposed so as to radially protrude from the axis of rotation (a) when the same vibrational nodes ($K_L$) are present.

7. The ultrasonic vibration unit according to claim 5, characterized in that a plurality of sealing horns (16) is disposed so as to radially protrude from the axis of rotation (a) when different vibrational nodes ($K_L$) are present.

8. An ultrasonic vibration unit for an ultrasonic welding device for sealing and welding material webs, comprising a sonotrode (12) connected to a converter (14) and having at least one sealing horn (16) radially protruding from an axis of rotation (a) and rotatable about the axis of rotation (a) and having a free end forming a sealing surface (18), wherein the sonotrode (12) comprises a sonotrode shaft (20) having the axis of rotation (a), wherein at least one end face (22) of the sonotrode shaft (20) is connected to the converter (14) and the at least one sealing horn is attached to the sonotrode shaft (20) by means of boosters (24, 26) when vibrational nodes ($K_L$) of a longitudinal vibration ($S_{W1}$) in the sonotrode shaft (20) are present, and wherein each booster (24, 26) is positioned between the at least one sealing horn (16) and the sonotrode shaft (20).

9. An ultrasonic vibration unit for an ultrasonic welding device for sealing and welding material webs, comprising a sonotrode (12) connected to a converter (14) and a plurality of sealing horns (16) radially protruding from an axis of rotation (a) and rotatable about the axis of rotation (a) and having a free end forming a sealing surface (18), wherein the sonotrode (12) comprises a sonotrode shaft (20) having the axis of rotation (a), wherein at least one end face (22) of the sonotrode shaft (20) is connected to the converter (14) and each of the plurality of sealing horns is attached to the sonotrode shaft (20) by means of separate boosters (24, 26) when vibrational nodes ($K_L$) of a longitudinal vibration ($S_{W1}$) in the sonotrode shaft (20) are present, and wherein each booster (24, 26) directly attaches the respective sealing horn (16) to the sonotrode shaft (20).

* * * * *